ature in the graphitizing of the fluid code is
United States Patent [19]
Tanno

[11] Patent Number: 5,853,918
[45] Date of Patent: Dec. 29, 1998

[54] LITHIUM SECONDARY BATTERY CONTAINING GRAPHITIZED CARBON ACTIVE MATERIAL

[75] Inventor: Satoshi Tanno, Iwaki, Japan

[73] Assignee: Furukawa Denchi Kabushiki Kaisha, Yokohama, Japan

[21] Appl. No.: 701,329

[22] Filed: Aug. 23, 1996

[30] Foreign Application Priority Data

Aug. 25, 1995 [JP] Japan ................................ 7-240803
Aug. 8, 1996 [JP] Japan ................................ 8-226039

[51] Int. Cl.⁶ ................................................ H01M 4/58
[52] U.S. Cl. .................................................... 429/218
[58] Field of Search ............................................ 429/218

[56] References Cited

U.S. PATENT DOCUMENTS

| | | | |
|---|---|---|---|
| 5,069,683 | 12/1991 | Fong et al. | |
| 5,130,211 | 7/1992 | Wilkinson et al. | |
| 5,344,724 | 9/1994 | Ozaki et al. | 429/94 |
| 5,344,726 | 9/1994 | Tanaka et al. | 429/218 X |
| 5,474,861 | 12/1995 | Bito et al. | 429/218 X |
| 5,482,797 | 1/1996 | Yamada et al. | 429/218 |

FOREIGN PATENT DOCUMENTS 0 474 183 A2   3/1992   European Pat. Off. .

OTHER PUBLICATIONS

The Structure of Carbon Deposits on HDS Catalysts, Chemical Abstracts, vol. 98, No. 12, By J. Sanders, et al., 1983, no month.

Communication from European Patent Office for European Patent Application 96113546.4, dated Dec. 16, 1996.

*Primary Examiner*—John S. Maples
*Attorney, Agent, or Firm*—Armstrong, Westerman, Hattori, McLeland & Naughton

[57] ABSTRACT

A carbon material composed of a layer structure and a turbostratic structure obtained by subjecting fluid coke to a graphitizing treatment is used as an active material for the negative electrode of a lithium secondary battery. The burning temperature in the graphitizing of the fluid code is preferably more than 2000° C., and more preferably is more than 2500° C. A lithium secondary battery using the above-mentioned active material for the negative electrode thereof is excellent in flatness of the electric potential and also has decreased capacity loss at the initial stage of charge and discharge cycles.

3 Claims, 3 Drawing Sheets

LITHIUM SECONDARY BATTERY CONTAINING GRAPHITIZED CARBON ACTIVE MATERIAL

The present invention relates generally to an active material adapted for use as a negative electrode for a lithium secondary battery as well as a lithium secondary battery which includes such active material in the negative electrode.

Recently, remarkable improvements have been made in the performance of electronic instruments and devices such as notebook personal computers, cordless telephones, portable telephones and the like, particularly in terms of the miniaturization, reduction in weight, and higher performance of such instruments and devices. With these improvements, the performance requirements for the batteries used as power sources for these instruments and devices also has been raised. In particular, these requirements have prompted development of any rechargeable secondary battery which is smaller in size, lighter in weight and higher in performance. As a result, there have been developed lead-acid storage batteries, alkaline storage batteries, etc. as a conventional typical secondary battery.

In order to meet the above-mentioned requirements, research has been actively conducted relative to lithium secondary batteries with high output and high energy density. As active materials for the negative electrode of such lithium secondary batteries, metallic lithium, lithium alloys, carbonaceous materials, graphite materials, etc. have been used.

However, when metallic lithium or a lithium alloy is used as the active material for the negative electrode of a lithium secondary battery, problems such as lithium ions produced by dissolving lithium in a non-aqueous electrolyte at the time of discharging are deposited at the time of charging and, at that time, are reacted with the electrolyte. As a consequence, a part thereof is inactivated and dendrites of lithium are generated and grown, which results in the deterioration of the negative electrode.

However, when any kind of carbonaceous materials obtained by burning at about 1000° C. starting materials such as coal tar, pitch, carbohydrate, furfuryl alcohol resin, etc., is used as an active material for the negative electrode, the deterioration of the negative electrode caused by the deposition of lithium dendrites is solved. On the other hand, such an active material for the negative electrode has the defect that the flatness of the electric potential at the initial stage of the charge and discharge cycles is poor.

When any kind of graphite material obtained by heating at about 2000° C. easy graphitizing carbonaceous materials such as coal coke or various kinds of cokes, pitch, mesophase carbon, gaseous phase growth carbon, etc., is used as an active material for the negative electrode, the above-described electric flatness is excellent. However, such an active material has the defect that a considerable amount of lithium is consumed due to the irreversible reaction occurring at the time of charging of the first charge and discharge cycle and, as a result, the irreversible capacity, that is, capacity loss, is increased.

SUMMARY OF THE INVENTION

It is therefore a feature of the present invention to provide an active material adapted for use as a negative electrode for a lithium secondary battery that is free from the above-mentioned defects with conventional lithium secondary batteries and provides a lithium secondary battery which is excellent in flatness of the electric potential and also has decreased irreversible capacity, that is, capacity loss at the initial stage of the charge and discharge cycles, resulting in a high capacity. The subject active material for use as a negative electrode comprises a carbon material composed of a layer structure and a turbostratic structure obtained by subjecting fluid coke to a graphitization treatment.

Preferably, the burning temperature in the graphitization treatment of the fluid coke is more than 2000° C., and thereby the carbon material having the above mentioned structures can be favorably obtained, and more preferably, the burning temperature is more than 2500° C.

Furthermore, another feature of the present invention is to provide a lithium secondary battery which includes a negative electrode made using such an active material for the negative electrode as mentioned above, that is, a carbon material having the plano or layer structure and the turbostratic structure obtained by subjecting fluid code to a graphitization treatment.

DETAILED DESCRIPTION OF THE PREFERRED EMBODIMENTS

Figure 1:
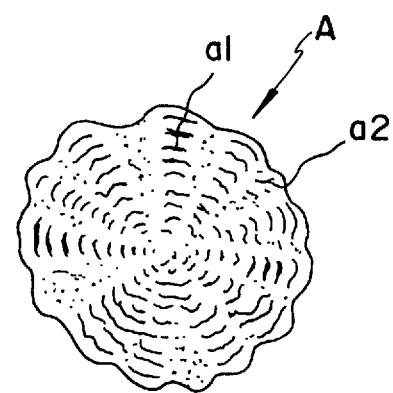
FIG. 1 is a schematic sectional view of a particle of carbon material composed of the layer structure and the turbostratic structure obtained by graphitization of fluid coke according to one embodying example of the present invention.

The present invention is particularly characterized in that fluid coke, that is, petroleum coke made by fluid coking process, is used as a raw material, and this fluid coke is subjected to graphitizing treatment, preferably at burning temperature of about 2000° C. or higher, more preferably at about more than 2500° C., for instance, in the range of 2500° C. to 3000° C., so that a particularly type of carbon material is obtained. This carbon material comprises a mass of particles where individual particles are composed of a layer structure a1 in which a number of lattice planes each of which is formed such that a lattice plane formed by linking a number of regular hexagonal rings of carbon atoms of the graphite in the same plane are stacked one with another, and a turbostratic structure a2 formed by disordering these stacked lattice layers, resulting in a "chrysanthemum flower" like appearance as shown in FIG. 1. Furthermore, the invention is characterized in that the active material thus obtained above is used as an active material for a negative electrode of a lithium secondary battery.

A lithium secondary battery according to the present invention generally only differs in its construction from conventional lithium secondary batteries in that the negative electrode is manufactured by mixing the above-mentioned active material as a main component with a binder such as Teflon or the like, and then forming the resultant mixture by pressing into the negative electrode. Thus, a positive electrode for a lithium secondary battery according to the present invention may be manufactured by using as a raw material such oxides capable of intercalating lithium ions into the spaces in the crystalline structure thereof and deintercalating them from the spaces as vanadium oxides, manganese oxides, etc. Such oxides contain lithium in the crystalline structures thereof and capable of deintercalating the lithium therefrom and intercalating it thereinto as lithiated cobalt oxides or manganese oxides with the spinel structure, or complex oxides thereof in which part of the Mn and Co thereof have been replaced by Fe, Ni, etc., or nitrides, etc.

As for electrolytes of a lithium secondary battery according to the present invention, a non-aqueous organic electrolyte prepared by dissolving at least one kind of lithium salt in any kind of known organic solvent(s) may be used.

Next, specific embodying examples according to the present invention and comparative examples will be described below so as to illustrate the effect that a negative electrode for a lithium secondary battery using the active material for the negative electrode according the present invention brings about excellent flatness of the electric potential and also a decrease in the irreversible capacity, that is, the capacity loss at the initial stage of charge and discharge cycles.

EXAMPLE 1

Chrysanthemum flower-like fluid carbon material powder having the layer structure and the turbostratic structure as shown in FIG. 1 was obtained by graphitizing at a burning temperature of 2800° C. fluid coke (product name F-2900) manufactured by Kansai Nitsukagaku Kabushika Kaisha (The Kansai Coke & Chemicals Co., Ltd.). This fluid carbon material powder and Teflon powder, i.e, tetrafluoroethylene powder, were mixed together in a ratio of 9:1 by weight to make a mixture for a negative electrode, and the resultant mixture was pressed to be formed in the shape of a disk, and thus a working electrode was manufactured. As for a counter electrode, a small sized disk made of metallic lithium was used. This disk was obtained by cutting the disk out in a predetermined size from a larger sized sheet of metallic lithium. The electrolyte used was a non-aqueous organic solvent containing a lithium hexafluoroborate salt ($LiPF_6$), the solvent being a solvent mixture prepared by mixing ethylene carbonate and diethyl carbonate in a ratio of 1:1 by volume. A coin type cell of CR 2023 type was manufactured in which the said working electrode as above was used as the positive electrode and the said counter electrode was used as the negative electrode. This cell is referred to as "test cell A".

Figure 2:
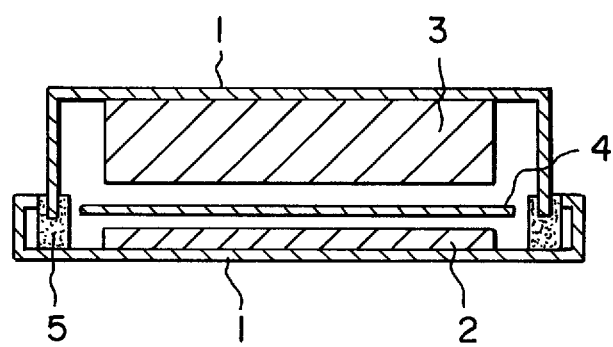
FIG. 2 is a sectional view of a test cell using the active material according to one example of the present invention.

The construction of the cell is shown in FIG. 2. In FIG. 2, numeral 1 denotes a cell container, 2 denotes the working electrode, 3 denotes the counter electrode, 4 denotes a separator, and 5 denotes an insulating sealing member.

COMPARATIVE EXAMPLE 1

A coin-type cell was manufactured in the same manner as in Example 1 except that artificial graphite was used as an active material for the working electrode. This cell is referred to as "test cell B".

COMPARATIVE EXAMPLE 2

A coin-type cell was manufactured in the same manner as in Example 1 except that the carbon material obtained by burning coal coke at 1200° C. was used as an active material for the working electrode. This cell is referred to as "test cell C".

COMPARATIVE EXAMPLE 3

A coin-type cell was manufactured in the same manner as in Example 1 except that the carbon material obtained by burning coal coke at 2500° C. was used as an active material for the working electrode. This cell is referred to as "test cell D".

Figure 3:
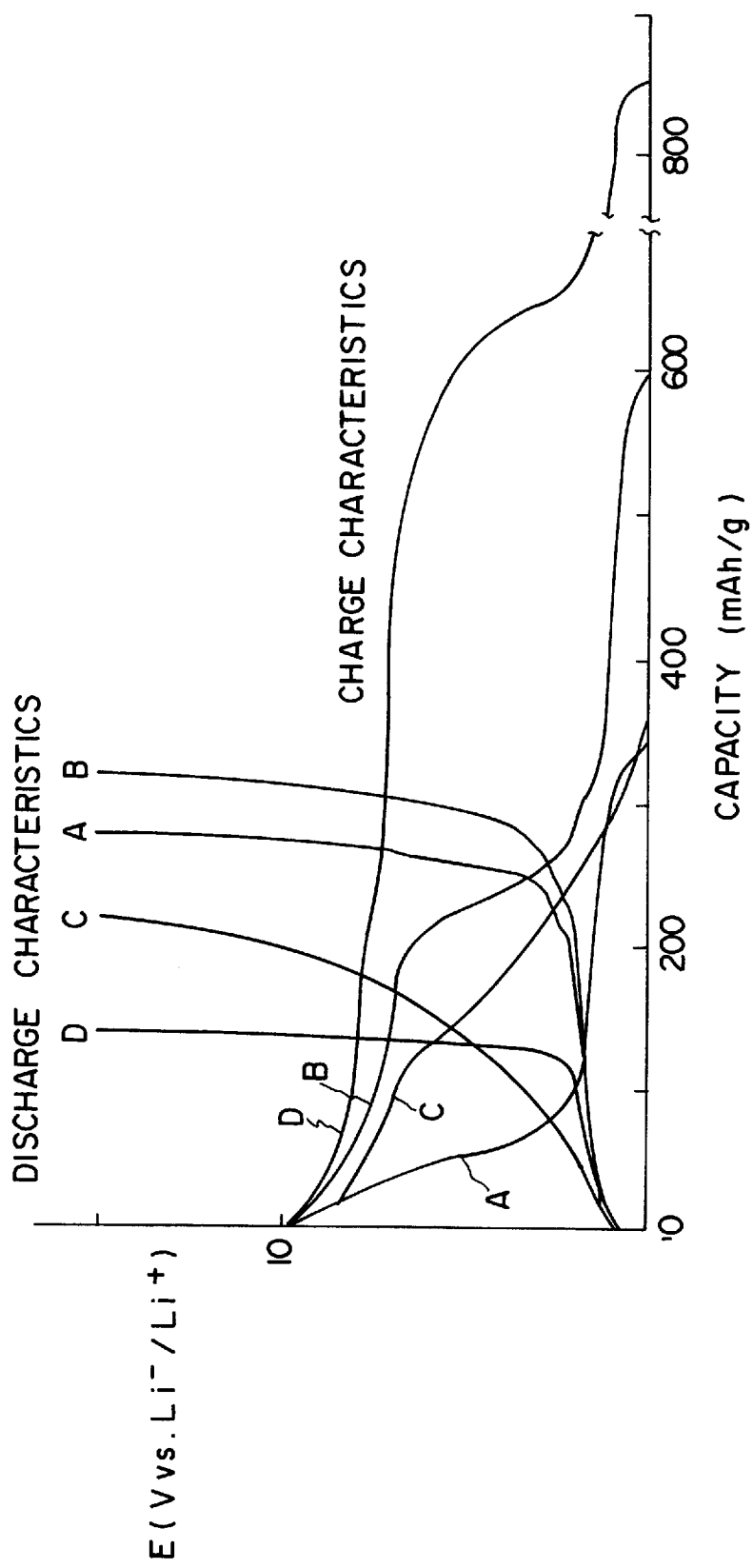
FIG. 3 is a comparison diagram showing the initial charge and discharge characteristics of a test cell using the active material according to one example of the present invention and test cells using comparative active materials.

For each of these test cells A through D, the cell was subjected to one cycle of charging and discharging. The cycle was conducted under conditions such that each cell was charged with a current density of 0.5 $mA/cm^2$ until an electric potential of the working electrode to lithium metal constituting the counter electrode became 0 volt and then the cell was discharged with the same current density as above until the electric potential of the working electrode to the counter electrode became 1.5 volt. Thereafter, the initial charge and discharge characteristics of each of these test cells were evaluated. The results thereof are shown in the following Table 1 and FIG. 3. FIG. 3 shows the initial charge and discharge characteristics of the respective test cells at the first cycle.

TABLE 1

|  | Charge capacity (mAh/g) | Discharge capacity (mAh/g) | Irreversible capacity (mAh/g) |
|---|---|---|---|
| Test cell A | 340 | 280 | 60 |
| Test cell B | 590 | 320 | 270 |
| Test cell C | 350 | 220 | 130 |
| Test cell D | 350 | 190 | 660 |

As is evident from Table 1 and FIG. 3, test cell A using a working electrode comprising the active material obtained by using the fluid coke as the raw material and graphitizing the coke according to the concepts of this invention has a much smaller irreversible capacity, that is, a capacity loss in the initial charge and discharge cycle, as compared with the test cells B to D using the working electrodes comprising the active materials obtained by using the other types of materials as the raw material and graphitizing the same.

Furthermore, from FIG. 3, it is apparent that test cell A using the active material for the working electrode according to this invention is excellent in the flatness of the electric potential at the discharge time of the first charge and discharge cycle as compared with test cell B which used graphite as the active material for the working electrode and with test cell D which used the resultant material obtained by burning coal coke at high temperature as the active material for the working electrode.

In addition, respective lithium secondary batteries were manufactured which comprise respective negative electrodes using as a main component the foregoing respective active materials which have been used of the respective working electrodes, respective positive electrodes using a main component such active materials as lithiated cobalt oxides or the like and such respective organic electrolytes as mentioned above. For these respective lithium secondary batteries, comparison test for examining the respective initial charge and discharge characteristics thereof were carried out. As a result, the initial charge and discharge characteristics which are similar to the results obtained with the above-mentioned Example 1 and Comparative Examples 1 to 3 were obtained.

From the above, it has been concluded that a lithium secondary battery according to the present invention has excellent characteristics in term of flatness of the electric potential at the discharge time of the first cycle of the charge and discharge, and also that such a lithium secondary battery has a decreased irreversible capacity, that is, capacity loss at the first charge and discharge cycle.

Next, the following comparative tests illustrate that when fluid coke is subjected to a graphitization treatment by burning, the burning temperature of this treatment is preferably more than 2000° C. and, more preferably, the burning temperature of the treatment is more than 2500° C.

EXAMPLE 2

A coin-type cell was manufactured in the same manner as in Example 1 except that the carbon material obtained from fluid coke made by The Kansai Coke & Chemicals Co., Ltd., was graphitized at a burning temperature of 2500° C. This cell is referred to as "test cell E".

EXAMPLE 3

A coin-type cell was manufactured in the same manner as in Example 1 except for that carbon material obtained by fluid coke made by The Kansai Coke & Chemicals Co., Ltd., was graphitized at a burning temperature of 2000° C. This cell is referred to as "test cell F".

COMPARATIVE EXAMPLE 4

A coin-type cell was manufactured in the same manner as in Example 1, except for that carbon material obtained by fluid coke made by The Kansai Coke & Chemicals Co., Ltd. was graphitized at a burning temperature of 1500° C. This cell is referred to as "test cell G".

Figure 4:
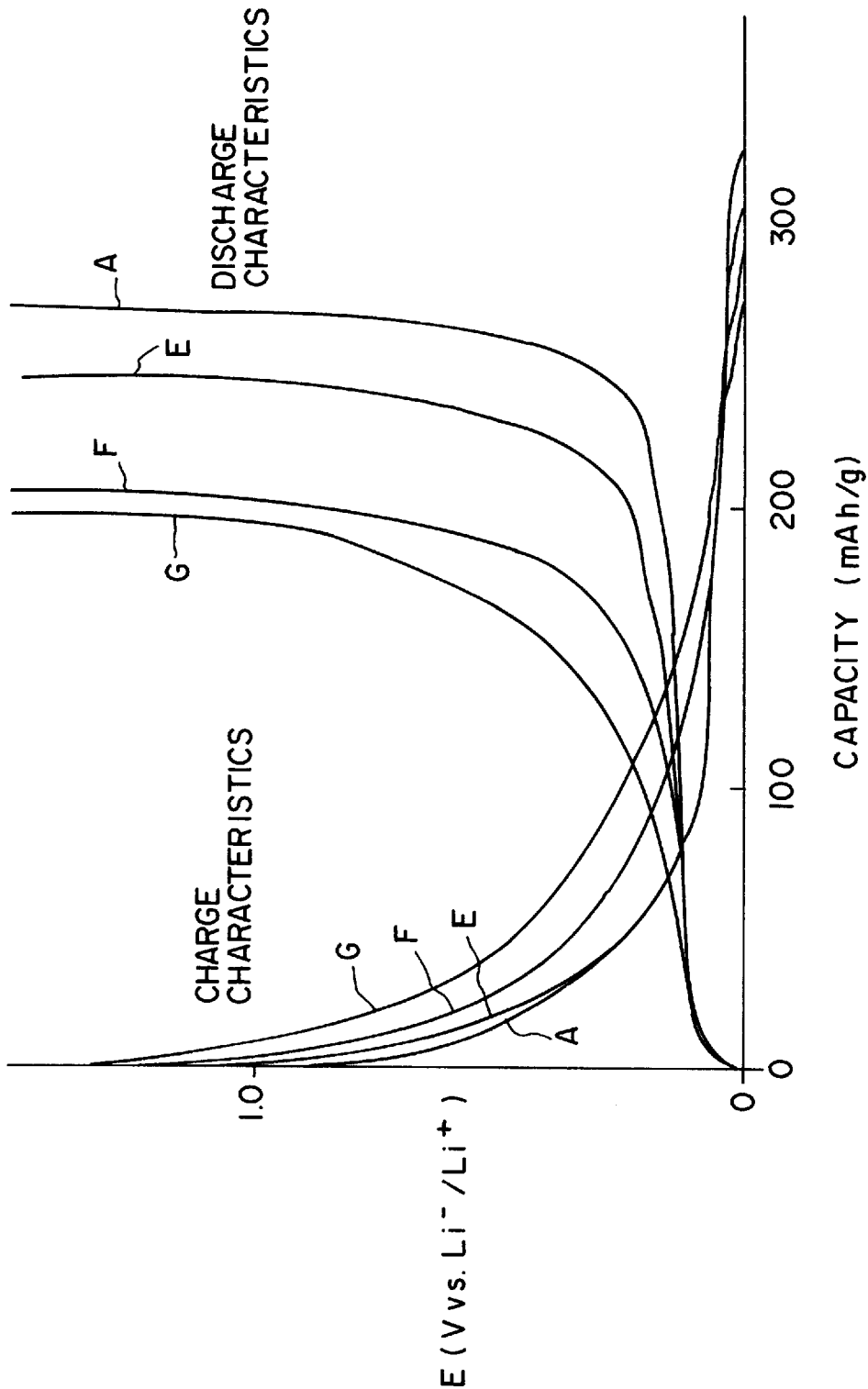
FIG. 4 is a comparison diagram showing the relationship between test cells and the burning temperatures in the graphitization of fluid coke.

For each of these test cells E to G, the cells were subjected to one cycle of charging and discharging under the conditions that the cell was charged with a current density of 0.5 mA/cm$^2$ until an electric potential of the working electrode to lithium metal constituting the counter electrode became 0 volt and the cell was then discharged with the same current density as above until the electric potential of the working electrode to the counter electrode became 1.5 volt. The initial charge and discharge characteristics of each of these test cells then were evaluated. The results thereof are shown in the following Table 2 and in FIG. 4. FIG. 4 shows the initial charge and discharge characteristics of the respective test cells at the first cycle.

TABLE 2

| | Charge capacity (mAh/g) | Discharge capacity (mAh/g) | Irreversible capacity (mAh/g) |
| --- | --- | --- | --- |
| Test cell A | 340 | 280 | 60 |
| Test cell E | 315 | 250 | 65 |
| Test cell F | 268 | 200 | 68 |
| Test cell G | 280 | 200 | 80 |

As is evident from Table 2 and FIG. 4, test cells A, E and F using the active materials for the working electrodes obtained by graphitizing the fluid cokes at burning temperatures of more than 2000° C. have a smaller irreversible capacity, that is, capacity loss in the initial charge and discharge cycle, than test cell G using the active material for the working electrode obtained by graphitizing the fluid coke at the burning temperature of less than 2000° C. It also is evident that, at a burning temperature of more than 2500° C., both the effects of obtaining excellent flatness of the electric potential and decreasing the capacity loss in the initial stage of the charge and discharge cycles are increased.

Furthermore, respective lithium secondary batteries were manufactured which comprise respective negative electrodes using as a main component the foregoing respective active materials which have been used for the respective working electrodes, respective positive electrodes using as a main component such active materials as lithiated cobalt oxides or the like and such respective organic electrolytes as mentioned above. For these respective lithium secondary batteries, comparison tests for examining the respective initial charge and discharge characteristics thereof were carried out. As a result, the initial charge and discharge characteristics which are similar to the results obtained with the above-mentioned Examples 1 to 4 were obtained.

Thus, it has been found that a lithium secondary battery in accordance with the present invention has excellent characteristics in terms of the electric potential and also has decreased irreversible capacity, that is, capacity loss at the initial stage of the charge and discharge cycles.

A lithium secondary battery using as the negative electrode thereof the active material for the negative electrode according to the present invention is particularly applicable as a power source for electronic instruments and devices such as notebook personal computers, cordless telephones, portable telephones, and the like.

It is claimed:

1. A lithium secondary battery comprising a negative electrode comprising graphitized carbon material in a chrysanthemum flower appearance as is shown in FIG. 1 and composed of a layer structure and a turbostratic structure obtained by subjecting fluid coke to a graphitization treatment.

2. A lithium secondary battery as claim in claim 1, wherein the said carbon material is obtained by subjecting the fluid coke to the graphitizing treatment at burning temperature of 2000° C. or higher.

3. A lithium secondary battery as claim in claim 2, wherein the burning temperature is 2500° C. or higher.

* * * * *